United States Patent
Hawkes et al.

(10) Patent No.: US 10,786,883 B2
(45) Date of Patent: Sep. 29, 2020

(54) DEEP ROLLING TOOL AND METHOD

(71) Applicant: United Technologies Corporation, Farmington, CT (US)

(72) Inventors: Justin R. Hawkes, Marlborough, CT (US); Joseph C. Rampone, Colchester, CT (US); Andrzej Ernest Kuczek, Bristol, CT (US); Tahany Ibrahim El-Wardany, Bloomfield, CT (US); Randy P. Salva, Baltic, CT (US); Patrick Louis Clavette, Simsbury, CT (US); Thomas J. Garosshen, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 128 days.

(21) Appl. No.: 15/385,648

(22) Filed: Dec. 20, 2016

(65) Prior Publication Data
US 2018/0169828 A1 Jun. 21, 2018

(51) Int. Cl.
*B24B 39/04* (2006.01)
*B25J 15/00* (2006.01)
(Continued)

(52) U.S. Cl.
CPC ................ *B24B 39/04* (2013.01); *B23P 9/02* (2013.01); *B23Q 1/00* (2013.01); *B24B 39/00* (2013.01);
(Continued)

(58) Field of Classification Search
CPC .... B21D 39/023; B21D 39/021; B21D 19/02; B21D 19/04; B21D 19/043; B24B 39/00;
(Continued)

(56) References Cited

U.S. PATENT DOCUMENTS 3,430,327 A * 3/1969 Herbenar ............. F16C 11/0604
29/243.517
5,099,558 A * 3/1992 Wilson .................... B24B 39/04
29/90.01
(Continued)

FOREIGN PATENT DOCUMENTS

CN 105414833 A 3/2016
EP 0577876 A1 1/1994
(Continued)

OTHER PUBLICATIONS

Extended European Search Report for EP Application No. 17204904.1, dated May 14, 2018, 5 pages.
(Continued)

*Primary Examiner* — Edward T Tolan
(74) *Attorney, Agent, or Firm* — Kinney & Lange, P.A.

(57) ABSTRACT

An embodiment of a tool assembly includes a spring-loaded shaft assembly disposed along a first axis, a hub, and a roller disk. The hub is connected to a distal end of the spring-loaded shaft assembly. The hub has an upper hub portion adjacent to the distal end of the spring-loaded shaft assembly aligned with the first axis, and a lower hub portion extending along a second axis. The second axis forms an angle relative to the first axis. The roller disk is joined to the lower portion of the hub, and has a working surface about its perimeter. The roller disk is rotatable about the second axis parallel to the second portion of the hub. The working surface includes a profile along its width such that an effective radius of the roller disk varies along a width thereof.

20 Claims, 5 Drawing Sheets

(51) Int. Cl.
  *B23P 9/02* (2006.01)
  *B24B 39/00* (2006.01)
  *B23Q 1/00* (2006.01)
  *B21D 39/02* (2006.01)

(52) U.S. Cl.
  CPC ......... *B25J 15/0019* (2013.01); *B21D 39/023* (2013.01); *Y10S 901/41* (2013.01)

(58) Field of Classification Search
  CPC ..... B24B 39/04; B24B 39/003; B24B 39/006; B23P 9/02; C21D 7/02; C21D 7/04; C21D 7/08
  See application file for complete search history.

(56) References Cited

U.S. PATENT DOCUMENTS

| | | | |
|---|---|---|---|
| 5,228,190 A * | 7/1993 | Sawa | B21D 39/021 29/243.57 |
| 5,666,841 A * | 9/1997 | Seeger | B21H 7/16 72/110 |
| 6,415,486 B1 | 7/2002 | Prevey, III | |
| 7,134,304 B2 * | 11/2006 | Nakayama | B23P 9/02 72/102 |
| 8,601,659 B2 * | 12/2013 | Prevey | B24B 39/003 29/90.01 |
| 9,352,376 B2 * | 5/2016 | Cyrek | B21D 39/023 |
| 9,421,602 B2 | 8/2016 | Hawkes et al. | |
| 9,517,502 B2 | 12/2016 | Di Stefano et al. | |
| 9,908,160 B2 | 3/2018 | Okahisa et al. | |
| 2005/0155203 A1 | 7/2005 | Prevey | |
| 2005/0229666 A1 | 10/2005 | Toeniskoetter | |
| 2009/0106961 A1 * | 4/2009 | Tomioka | B24B 39/04 29/90.01 |
| 2009/0235505 A1 * | 9/2009 | Toeniskoetter | B21D 39/021 29/243.58 |
| 2012/0204390 A1 | 8/2012 | Prevey et al. | |
| 2013/0195671 A1 | 8/2013 | El-Wardany et al. | |
| 2014/0007394 A1 | 1/2014 | Haas et al. | |
| 2015/0033816 A1 | 2/2015 | Neelakandan et al. | |
| 2015/0130321 A1 | 5/2015 | Maki-Ontto et al. | |
| 2015/0165500 A1 | 6/2015 | Hawkes et al. | |
| 2015/0165515 A1 | 6/2015 | Hawkes et al. | |
| 2015/0360289 A1 | 12/2015 | Liou et al. | |
| 2017/0056953 A1 * | 3/2017 | Serpi | B21D 39/023 |
| 2017/0151602 A1 * | 6/2017 | Alana Gomez | B21D 39/02 |
| 2017/0282327 A1 * | 10/2017 | Maldaner | B24B 39/04 |

FOREIGN PATENT DOCUMENTS

| | | |
|---|---|---|
| EP | 2821159 A1 | 1/2015 |
| WO | WO2015105655 A1 | 7/2015 |
| WO | WO2015125084 A1 | 8/2015 |
| WO | WO2016041540 A2 | 3/2016 |

OTHER PUBLICATIONS

Extended European Search Report for EP Application No. 17204706.0, dated Mar. 29, 2018, 8 pages.
Extended European Search Report for EP Application No. 17204596.5, dated Apr. 12, 2018, 6 pages.

* cited by examiner

DEEP ROLLING TOOL AND METHOD

BACKGROUND

The disclosed subject matter relates generally to materials processing, and more specifically to apparatus and methods for deep rolling metals to induce compressive stresses.

A low plasticity burnishing (LPB) process can be used on aluminum fan blade roots to improve damage tolerance from e.g., corrosion. This can increase fatigue life or maintain fatigue life in the presence of damage (e.g., corrosion pits).

Known LPB tools for complex geometries utilize a ball bearing at the end of an axisymmetric, hydraulically actuated shaft. However, this tool is expensive and it involves complex processing steps. Further, despite its relatively high precision, the small surface area of a ball bearing unnecessarily slows production time and throughput. These known tools also cannot be readily used with widely available machine tools due to the need to maintain and constantly adjust hydraulic pressure on the bearing surface.

An alternative process includes deep rolling process, which can induce high compressive stresses up to 1.5 mm depth from the surface of a material through localized plastic deformation to prevent corrosion pits, foreign object damage, crack initiation, etc.

Known deep rolling tools available in the market are usually used for simple geometries In addition, these tools are expensive may involve complex processing steps, and is sometimes difficult to use for thin walls or complex shapes that require five and six axes deep rolling paths and can be easily achieved using robotic arrangements.

Controlling the contact stress between the roller and material being processed is important to achieving desired improvements in material properties. With insufficient contact stress, little or no improvement will be achieved. In addition, there is also a need to customize the applied load and consequently the contact stress along the deep rolling path. Too high of a contact stress can damage the material on/near the surface resulting in a decrement in properties.

SUMMARY

An embodiment of a tool assembly includes a spring-loaded shaft assembly disposed along a first axis, a hub, and a roller disk. The hub is connected to a distal end of the spring-loaded shaft assembly. The hub has an upper hub portion adjacent to the distal end of the spring-loaded shaft assembly aligned with the first axis, and a lower hub portion extending along a second axis. The second axis forms a nonzero angle relative to the first axis. The roller disk is joined to the lower portion of the hub, and has a working surface about its perimeter. The roller disk is rotatable about the second axis parallel to the second portion of the hub.

An embodiment of a method includes supporting a workpiece in a fixture, the workpiece having at least one nonplanar surface. A first rolling operation is performed on the nonplanar surface. The first rolling operation includes applying a downward force to a proximal end of a spring-loaded deep rolling tool shaft aligned with a first axis. The downward force is applied along the first axis such that the downward force is transferred through the shaft to a hub disposed at a distal end of the shaft assembly. The transferred downward force is transmitted from an upper portion of the hub aligned with the first axis to a lower portion of the hub parallel to a second axis, the second axis forming a nonzero angle relative to the first axis, about which a roller disk is supported by one or more bearings. A resulting compressive force is applied to the first nonplanar surface of the workpiece via a working surface of the roller disk.

DETAILED DESCRIPTION

Generally, a roller disk with a crowned or otherwise nonplanar working surface about its perimeter can be attached to an end of a spring loaded shaft. The tool can be attached to a device to process one or more parts. The tool uses multiple tool passes to induce residual compressive stresses while maintaining the appropriate level or range of contact stresses at the roller's point of contact via selective spring loading of the tool.

Figure 1:
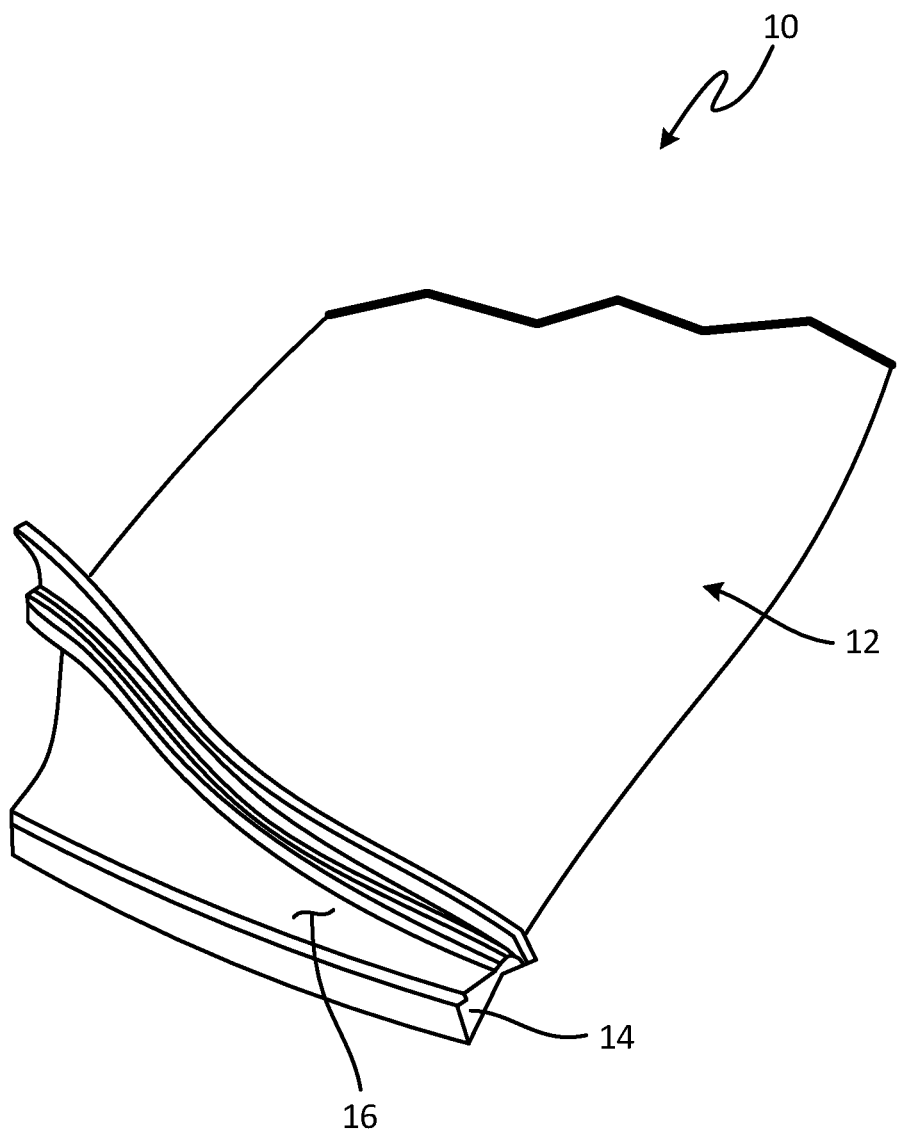
FIG. 1 is a perspective view of a dovetail root portion of a gas turbine engine blade.

FIG. 1 shows workpiece 10, which can be supported in a suitable fixture (not shown). Workpiece 10 has airfoil 12 and dovetail root 14. At least one nonplanar surface is to be processed (e.g., junction 16 between airfoil 12 and root 14) to have residual compressive stresses near the surface in and around junction 16.

In this example, workpiece 10 is an aluminum alloy fan blade for a turbofan engine, but the process can be adapted to nearly any workpiece having a nonplanar surface into which residual compression stresses are desired to be incorporated.

Thus in the example of a dovetail-rooted blade, it is desired to increase residual compressive stresses around both sides of junction 16 between dovetail root 14 and airfoil 12. As most of the bending stresses are concentrated around junction 16, this location is most prone to fatigue damage. The combined effects of fatigue and corrosion pitting can be reduced via deep rolling because the residual compressive stress induced by application of the rolling tool (shown in subsequent figures) reduces the pathways for damage to propagate through the part, extending the time before failure or replacement.

Figure 2:
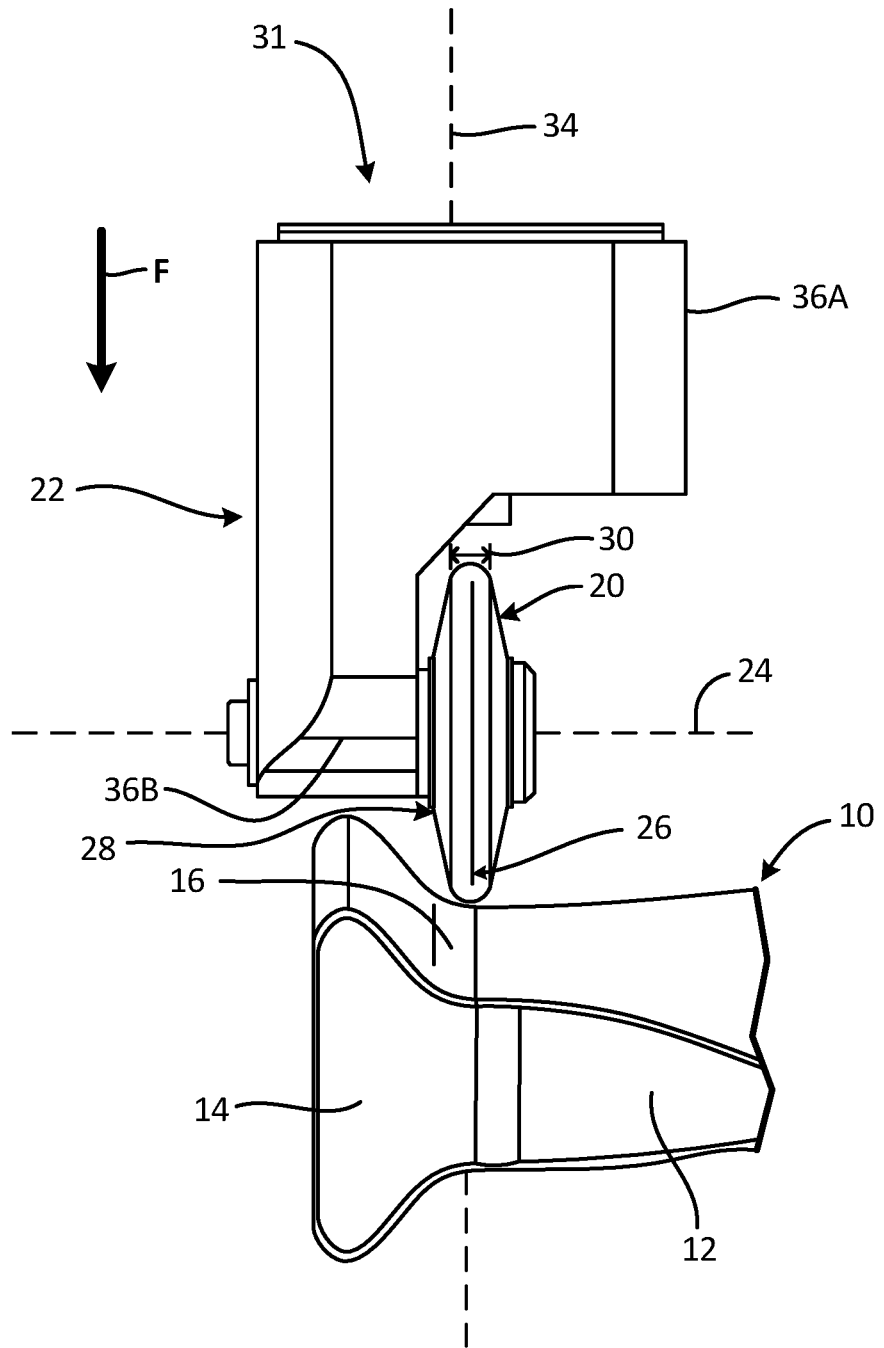
FIG. 2 shows a roller processing a workpiece such as a blade root shown in FIG. 1.

FIG. 2 shows roller disk 20 processing junction 16 of workpiece/blade 10 between airfoil 12 and root 14. Disk 20 can be joined to a portion of hub 22 with roller disk 20 rotatable about an axis 24 angled relative to a downward force direction F. Here, axis 24 is normal to downward force direction F and thus, resulting downward contact force is applied to junction 16 generally in direction F as well.

Disk 20 has working surface 26 about its perimeter 28, and can include a profile along its width 30 (best seen in FIGS. 3 and 4), such that an effective radius of the roller disk varies along a width thereof. It can be seen in FIG. 2 that the disk should be of a radius that provides clearance over protruding regions of the workpiece (e.g., dovetail root 14). In a conventional arrangement for processing a modern aluminum fan blade dovetail, this requires a minimum disk radius of about 2 inches (51 cm), but the size will vary depending on a particular application.

Figure 3:
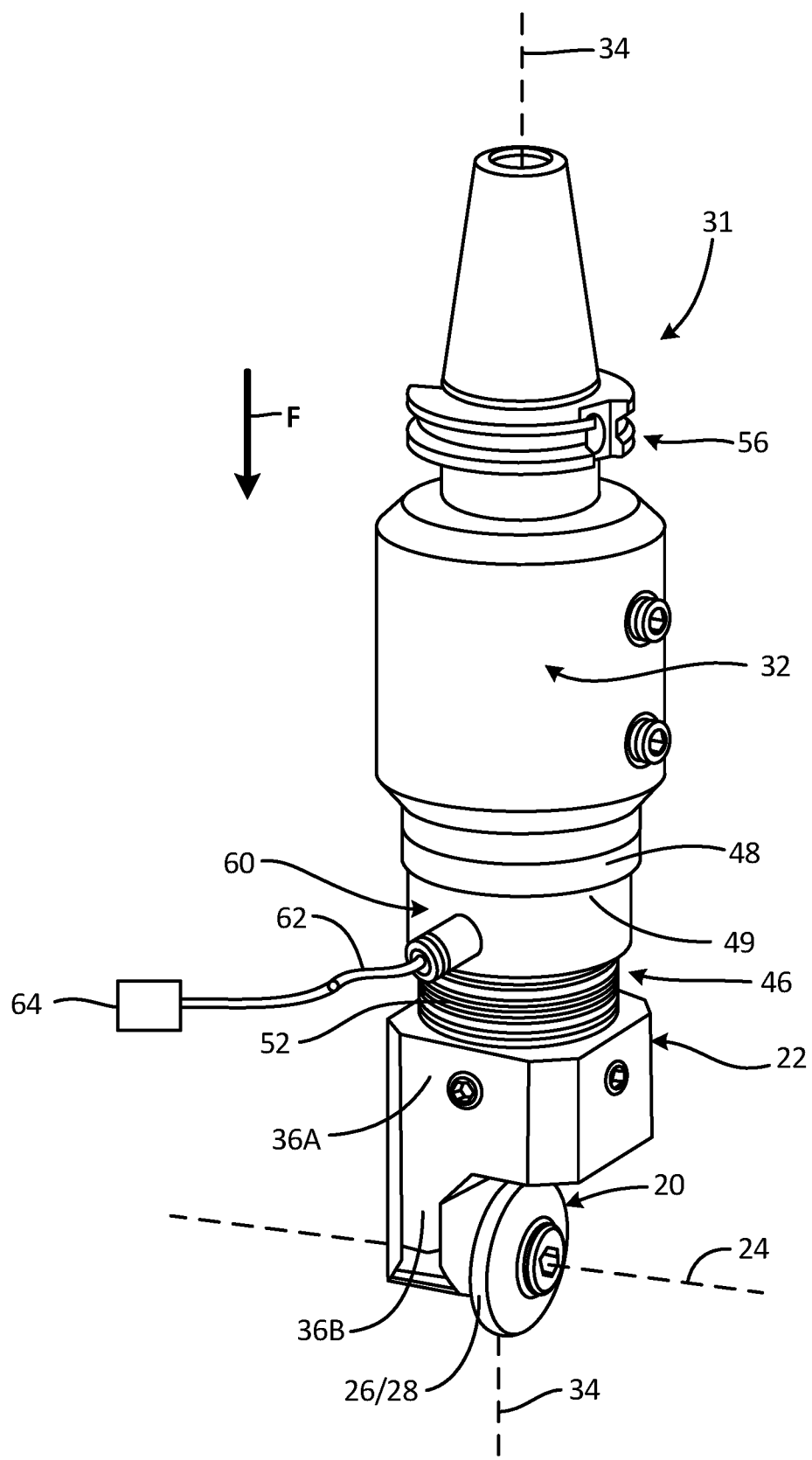
FIG. 3 is a perspective view of an embodiment of a deep rolling tool.

Hub 22 connects disk 20 to a shaft through which the downward force can be applied in direction F. One example embodiment of a deep rolling tool incorporating this construction is shown in FIG. 3. Tool assembly 31 includes spring-loaded shaft assembly 32 disposed along axis 34, which is parallel to downward force direction F. Hub 22 can have a first/upper portion 36A along axis 34 and a second/lower portion 36B at a nonzero angle relative to axis 34. This angle is therefore consistent with the nonzero angle between axis 24 and direction F.

Operation of tool assembly 31 can be as follows. The rolling operation can include applying a force in direction F along axis 34 such that the applied force is transferred through spring-loaded shaft assembly 32, hub 22, and roller disk 20 to a first nonplanar surface of the workpiece (e.g., junction 16). The resulting force applied to the first nonplanar surface varies along the width of working surface 26 of the disk due to the variable profile across width 30 (seen in FIG. 2).

At least one rolling operation can be performed on a nonplanar surface using a tool like that shown in FIG. 3. FIG. 3 depicts roller disk 20 joined to second/lower portion 36B of hub 22, and which is rotatable about axis 24 through second/lower portion 36B of hub 22. Roller disk 20 can be supported on one or more bearings (best seen in the exploded view of FIG. 4). As noted with respect to FIG. 2, disk 20 can have working surface 26 about perimeter 28, and can include a variable or crowned profile. As a result, an effective radius (and thus applied bearing stresses) of roller disk 20 varies along working surface 26. Though shown as a crowned roller with a single center peak, working surface 26 can additionally have one or more peaks, troughs, etc. The resulting profile can thus either be curved, slanted, or flat.

Spring-loaded shaft assembly 32 can take several different forms. In one non-limiting example, resilient element 46 is disposed at distal end 48 of shaft assembly 32, while a rigid shaft 50 (best seen in FIG. 4) can be supported on a device to restrain its movement only along first axis 14. This can include one or more linear bearings 49. In other embodiments, shaft assembly 32 can include a flexible beam without a separate resilient element.

With regard to resilient element 46, certain non-limiting embodiments include a plurality of stacked Belleville washers 52 which can be selected in number and properties in order to provide a desired level of resilience. Alternatively, resilient element 30 can include a diaphragm spring or the like.

Certain embodiments of tool assembly 31 can also optionally include other elements. For one, tool assembly 31 can include tool holder 56 mounted to proximal end 58 of rigid shaft 50 and/or shaft assembly 32. Tool holder 56 can be a standard or custom adapter or other device to facilitate attachment of tool assembly 31 to commercially available multi-axis computerized numerical control (CNC) machines (not shown). Tool holder 56 can additionally or alternatively facilitate attachment to other devices capable of steering tool assembly 31 while simultaneously applying sufficient (but not excessive) force in downward direction F to induce the desired compressive stresses.

Figure 4:
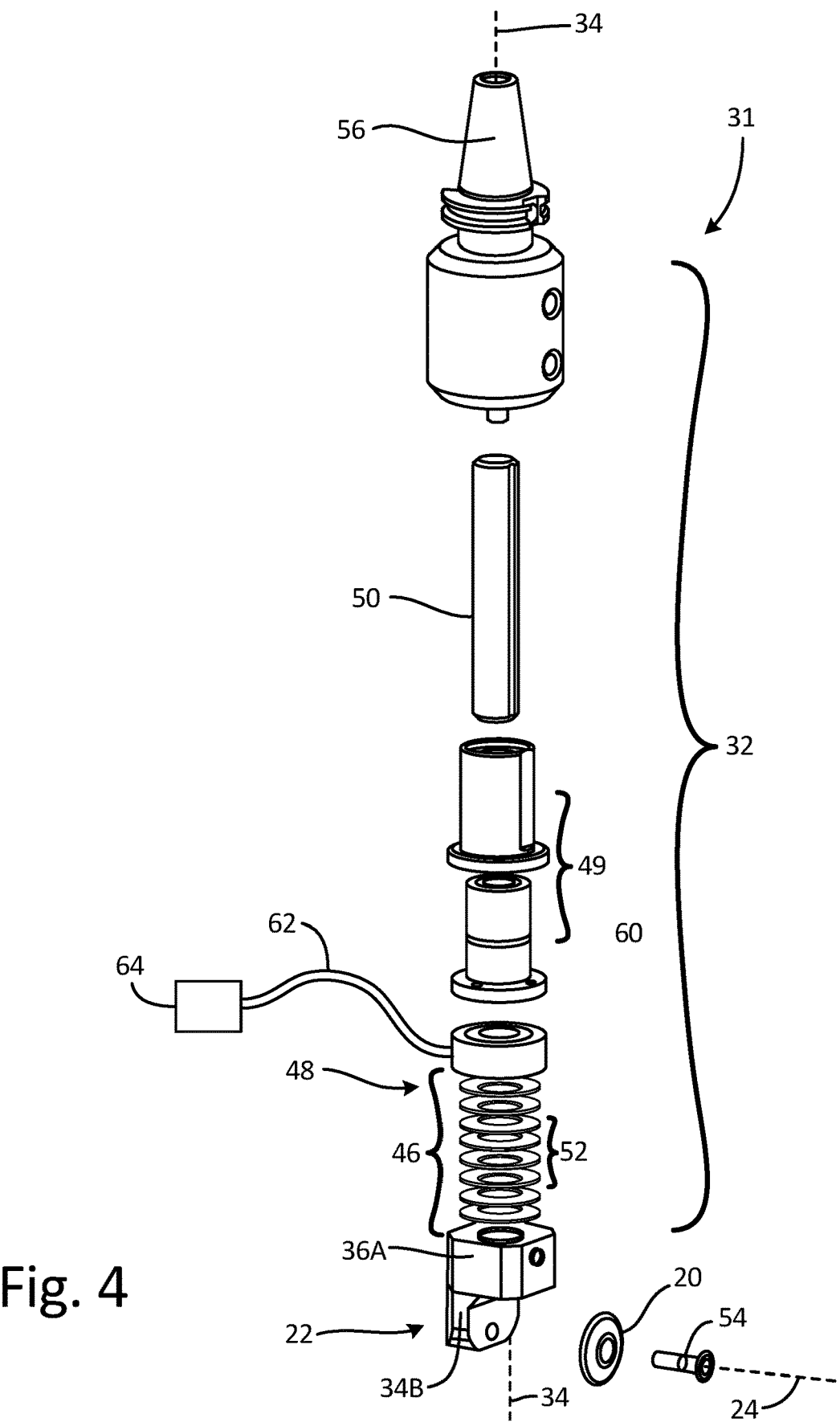
FIG. 4 is an exploded view of the deep rolling tool embodiment in FIG. 3.

In certain embodiments, tool assembly 31 can include load cell 60 to measure the force at the contact surface (see FIG. 4). Load cell 60 can optionally be disposed along axis 34 adjacent to resilient element 46, and can include a wired and/or wireless connection 62 for controller 64. This will be explained in more detail below.

FIG. 4 shows an exploded view of tool assembly 31 from FIG. 3. In addition to the elements described generally above, tool assembly 31 can include the following details. As noted, shaft assembly 32 is restricted to movement only along first axis 14. Thus, in this example embodiment, shaft assembly 32 can include linear bearing 48 arranged along axis 34 for supporting solid shaft 50. This simplifies determination of the downward force that needs to be applied in direction F, as any deflection away from that axis causes a reduction in the actual downward force vectors, while also applying unwanted transverse forces on the tool working surface.

In the example shown, hub 22 includes first and second portions 50A, 50B which form a right, or other, angle therebetween. Roller disk 20 is supported on a bearing or other device so that it is rotatable about axis 24. Here, with the right angle, axis 24 is perpendicular to first axis 14. In this example, working surface 26 of roller disk 20 is symmetrically crowned from a center to opposing first and second edges. Alternatively, working surface varies according to a desired load profile along the tool path and can include peaks, troughs, curves, etc.

Shaft assembly 32 can be calibrated before or between uses to provide a desired force concentration at working surface 26 of roller disk 20. In the example shown, at least one of solid shaft 50 and resilient element 36 can be calibrated so that the force applied to the tool in direction F (shown in FIGS. 2 and 3) and transmitted through roller disk 20 is sufficient to impart a residual compression stress in the workpiece at the first nonplanar surface (e.g. junction 16 in FIGS. 1 and 2).

The deep rolling tool described heretofore can be used in a number of different applications, depending on the required accuracy and precision of the applied forces needed. Success in some cases can be achieved by merely controlling the tool load within previously determined upper and lower bounds, such as through spring loading the tool and applying a target amount of compression to the spring. The compliance obtained by using a spring loaded tool enables an acceptable level of load control during processing but there is no record of what the actual contact stress was over the surface. However, this is the cheapest and often simplest option, where any suitable mechanical device with an ability to provide a controlled downward force can be used.

Some parts, however, require that the actual residual stresses at the working surface be verified. There are currently no non-destructive evaluation techniques that can be used to verify the correct level of residual stress was achieved during processing. Thus, a load cell or another feedback mechanism can be incorporated into the tool that allows monitoring and/or real-time adjustment of the force applied through the roller to the workpiece. The tool can process a part using multiple tool passes while maintaining the appropriate level of contact stress at the roller's point of contact. In some cases, the feedback is logged for quality control, so that it can be determined whether any irregularities occurred in the process. This is useful where scrapping and reprocessing parts is not a significant cost or limiting factor.

As was shown and described above, load cell 60 can optionally be incorporated into tool assembly 32. Load cell 60, in certain embodiments, is contiguous to resilient element 46 (e.g., plurality of Belleville washers 52), and enables real time monitoring of the applied load during processing. A deep rolling tool with an integral load cell thus enables verification of a key process parameter, roller load, which is critical for quality control in many production environments.

Process consistency could be further enhanced by using the load cell for closed loop load control which improve the precision with which the load could be maintained. Such a system would be much more tolerant of dimensional variability in the components being processed. It will also ensure that there are no microcracks on surface due to inadvertent localized application of intensive pressure.

Load cell 60 can be in wired or wireless communication with a controller 64 and/or monitor adapted to receive wired or wireless signals corresponding to an instantaneous load on resilient element 36. Controller/monitor 64 can include closed-loop feedback logic, by which it can be adapted to vary a force applied in direction F (see also FIGS. 2 and 3) on tool assembly 31, along axis 34. Operating load cell 60 can generate signals corresponding to an instantaneous load on resilient element 46. The magnitude of the force can be based at least in part on one or more of the signals received from and generated by load cell 60. The applied force is varied based on a plurality of signals from load cell 60 to impart a substantially equal residual compression stress in the workpiece along a tool rolling path on the first nonplanar surface.

The nature of many tools for CNC machines requires that they be axisymmetric (generally to facilitate rotation of the tool working end). Thus CNC programming and many common subroutines are generally tailored to this expectation. In contrast, the non-axisymmetric nature of tool assembly 31 can require that the CNC machine be provided with more complex programming even for some relatively simple tool paths. Depending on the desired tool paths and number of passes, programming and use of a CNC machine may be unnecessary or prohibitively complex, in which case, tool assembly 31 can be mounted to a different machine to apply the desired force over the contact path. While certain processes can generally performed using a specialized tool in a conventional CNC milling machine, the deep rolling tool can be inconsistent with generic subroutines and tool paths used to manipulate conventional axisymmetric tools. Therefore use of the deep rolling tool, which is not axisymmetric, has additional path programming constraints. While planar surfaces can be processed by the deep rolling tool using a 3-axis CNC machine, more complex geometry components will require at least a 5-axis machine and in some instances a 6-axis machine may be necessary. Maintaining the normality and orientation constraints for deep rolling of complex component geometries can be challenging as the tool path programming software won't automatically satisfy these required constraints. While creative programming can generally overcome these issues it may require an experienced and highly skilled programmer.

Figure 5:
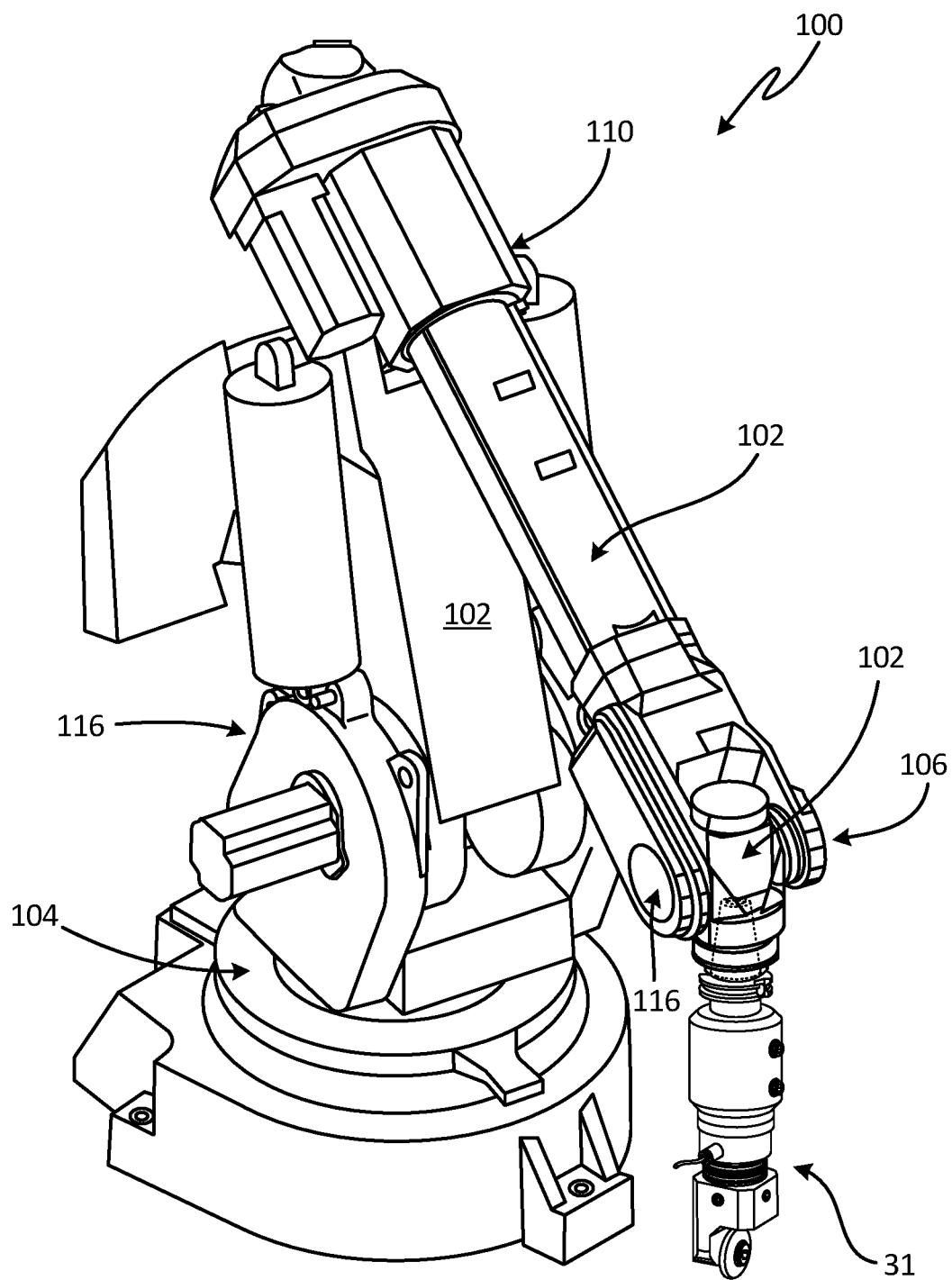
FIG. 5 shows an embodiment of a deep rolling tool attached to a robot arm for accessing difficult to process areas of a workpiece with the deep rolling tool.

To overcome this, deep rolling tool assembly 31 can be attached to the end of a robotic arm 100 as shown in FIG. 5. Robotic assembly 100 can include, for example, a plurality of linear arms 102 connected in series between base end 104 and working end 106. Adjacent ones of arms 102 can be connected via a corresponding plurality of multi-axis joints 110 such that working end 106 is articulated by movement of one or more of arms 102 relative to one or more of multi-axis joints 110.

Operation of a robotic assembly such as assembly 100 in FIG. 5 can include using it to apply a downward force over a rolling path of non-axisymmetric deep rolling tool assembly 31. The downward force is applied to a proximal end of a spring-loaded tool shaft (best seen in FIG. 2) aligned with a first axis, such that the downward force is transferred through the shaft to a hub disposed at a distal end of the shaft assembly (also best seen in FIG. 2). In certain embodiments, robotic assembly 100 is sufficiently programmed and/or controlled to provide the appropriate instantaneous feedback of downward force, and the resilient element in tool 31 can be modified or omitted as needed.

As described above, the transferred downward force is transmitted from an upper portion of the hub aligned with the first axis to a lower portion of the hub parallel to a second axis. The second axis forms a nonzero angle relative to the first axis, about which a roller disk is supported by one or more bearings. A resulting compressive force is applied to the first nonplanar surface of the workpiece via a working surface of the roller disk.

A typical commercial robot arm has more degrees of freedom than a 5-axis milling machine which facilitates processing of complex geometry parts. Current commercially available robot arms have been developed to the point where they can withstand the combination of high loads and precision required in deep rolling applications. The software for controlling robot arms is different to that for CNC milling machines and is more suited to maintaining the required orientation constraints of a multi-axis deep rolling tool. Also, it is easier to accommodate processing of large components using a robot arm, as the part does not have to fit inside the machine as it does with a milling machine.

Discussion of Possible Embodiments

An embodiment of a tool assembly according to an exemplary embodiment of this disclosure, among other possible things, includes spring-loaded shaft assembly disposed along a first axis; a hub connected to a distal end of the spring-loaded shaft assembly, the hub having an upper hub portion adjacent to the distal end of the spring-loaded shaft assembly aligned with the first axis, and a lower hub portion extending along a second axis, the second axis forming a nonzero angle relative to the first axis; and a roller disk joined to the lower portion of the hub, the roller disk having a working surface about its perimeter and being rotatable about the second axis parallel to the second portion of the hub.

The assembly of the preceding paragraph can optionally include, additionally and/or alternatively, any one or more of the following features, configurations and/or additional components:

A further embodiment of the foregoing assembly, wherein the shaft assembly comprises a flexible shaft.

A further embodiment of any of the foregoing assemblies, wherein the shaft assembly comprises: a rigid shaft; and a resilient element disposed at a distal end of the shaft assembly proximate to the hub.

A further embodiment of any of the foregoing assemblies, wherein the rigid shaft comprises a linear bearing arranged along the first axis.

A further embodiment of any of the foregoing assemblies, wherein the resilient element comprises a plurality of stacked Belleville washers.

A further embodiment of any of the foregoing assemblies, wherein the resilient element comprises a diaphragm spring.

A further embodiment of any of the foregoing assemblies, and further comprising a tool holder mounted to a proximal end of the shaft.

A further embodiment of any of the foregoing assemblies, wherein the upper hub portion and the lower hub portion define a right angle such that the roller disk is rotatable about the second axis perpendicular to the first axis.

A further embodiment of any of the foregoing assemblies, wherein the working surface of the roller disk includes a profile along its width such that an effective radius of the roller disk varies along a width thereof.

A further embodiment of any of the foregoing assemblies, wherein the working surface profile of the roller disk is crowned from a center to opposing first and second edges.

An embodiment of a method according to an exemplary embodiment of this disclosure, among other possible things, includes supporting a workpiece in a fixture, the workpiece having a first nonplanar surface: and performing a first rolling operation on the first nonplanar surface, the first rolling operation comprising: applying a downward force to a proximal end of a spring-loaded deep rolling tool shaft aligned with a first axis, the downward force applied along the first axis such that the downward force is transferred through the shaft to a hub disposed at a distal end of the shaft assembly; and transmitting the transferred downward force from an upper portion of the hub aligned with the first axis to a lower portion of the hub parallel to a second axis, the second axis forming a nonzero angle relative to the first axis, about which a roller disk is supported by one or more bearings, such that a resulting compressive force is applied to the first nonplanar surface of the workpiece via a working surface of the roller disk.

The method of the preceding paragraph can optionally include, additionally and/or alternatively, any one or more of the following features, configurations, steps, and/or additional components:

A further embodiment of the foregoing method, wherein the working surface includes a profile along its width such that an effective radius of the roller disk varies along a width thereof, such that the resulting compressive force applied to the first nonplanar surface varies along the width of the working surface.

A further embodiment of any of the foregoing methods, wherein the working surface of the roller disk is crowned from a center to opposing first and second edges.

A further embodiment of any of the foregoing methods, wherein the deep rolling tool shaft comprises: a rigid shaft extending along the first axis; and a resilient element disposed at a distal end of the rigid shaft adjacent to the hub.

A further embodiment of any of the foregoing methods, wherein the resilient element comprises a plurality of stacked Belleville washers.

A further embodiment of any of the foregoing methods, wherein the rigid shaft is supported by a linear bearing to restrain movement of the rigid shaft to the first axis.

A further embodiment of any of the foregoing methods, and further comprising connecting the proximal end of the shaft to an automated machine.

A further embodiment of any of the foregoing methods, and further comprising using the tool to perform a second rolling operation on a second nonplanar surface of the workpiece.

A further embodiment of any of the foregoing methods, wherein the second nonplanar surface is directly opposite the first nonplanar surface.

A further embodiment of any of the foregoing methods, wherein the roller disk is rotatable about the second axis perpendicular to the first axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A non-axisymmetric tool assembly comprising:
   a spring-loaded shaft assembly disposed along a first axis;
   a hub connected to a distal end of the spring-loaded shaft assembly, the hub having an upper hub portion adjacent to the distal end of the spring-loaded shaft assembly aligned with the first axis, and a lower hub portion extending along a second axis, the second axis forming an angle relative to the first axis;
   a roller disk joined to the lower portion of the hub, the roller disk having a non-axisymmetric working surface about its perimeter and being rotatable about the second axis parallel to the second portion of the hub, the working surface including a profile along its width such that an effective radius of the roller disk varies non-uniformly along a width thereof, the profile corresponding to a shape of a junction between an airfoil portion and a dovetail root portion of a fan blade workpiece; and
   means for generating and varying an applied force along the first axis such that the applied force is transferred through the spring-loaded shaft assembly and the hub to the non-axisymmetric working surface of the roller disk according to a programmed load profile that is configured to impart a compressive stress along the junction without deforming the workpiece;
   wherein the applied force is varied and monitored in real time according to the programmed load profile and feedback from a load cell.

2. The assembly of claim 1, wherein the shaft assembly comprises a flexible shaft.

3. The assembly of claim 1, wherein the shaft assembly comprises:
   a solid shaft to restrain movement only along the first axis; and
   a resilient element disposed at a distal end of the shaft assembly proximate to the hub.

4. The assembly of claim 3 wherein the solid shaft comprises a linear bearing arranged along the first axis.

5. The assembly of claim 3, wherein the resilient element comprises a plurality of stacked Belleville washers.

6. The assembly of claim 3, wherein the resilient element comprises a diaphragm spring.

7. The assembly of claim 1, and further comprising a tool holder mounted to a proximal end of the shaft assembly.

8. The assembly of claim 1, wherein the upper hub portion and the lower hub portion define a right angle.

9. The assembly of claim 8, wherein the roller disk is rotatable about the second axis perpendicular to the first axis.

10. The assembly of claim 1, wherein the working surface of the roller disk is crowned nonuniformly from a center to opposing first and second edges.

11. A method comprising:
    supporting a workpiece in a fixture, the workpiece having a first nonplanar surface: and
    performing a first rolling operation on the first nonplanar surface, the first rolling operation comprising:

applying a downward force to a proximal end of a spring-loaded non-axisymmetric deep rolling tool shaft assembly aligned with a first axis, the downward force applied along the first axis such that the downward force is transferred through the shaft assembly to a hub disposed at a distal end of the shaft assembly, the hub having an upper hub portion adjacent to the distal end of the spring-loaded shaft assembly aligned with the first axis, and a lower hub portion extending along a second axis, the second axis forming an angle relative to the first axis;

transmitting the transferred downward force from an upper portion of the hub aligned with the first axis to a lower portion of the hub parallel to a second axis, the second axis forming an angle relative to the first axis, about which a roller disk is supported by one or more bearings, such that a resulting compressive force is applied to the first nonplanar surface of the workpiece via a working surface of the roller disk, the roller disk having a non-axisymmetric working surface about its perimeter and being rotatable about the second axis parallel to the second portion of the hub, the working surface including a profile along its width such that an effective radius of the roller disk varies nonuniformly along a width thereof, the profile corresponding to a shape of a junction between an airfoil portion and a dovetail root portion of a fan blade workpiece; and generating and varying an applied force along the first axis such that the applied force is transferred through the spring-loaded shaft assembly and the hub to the non-axisymmetric working surface of the roller disk according to a programmed load profile that is configured to impart a compressive stress along the junction without deforming the workpiece;

wherein the applied force is varied and monitored in real time according to the programmed load profile and feedback from a load cell.

12. The method of claim 11, wherein the resulting compressive force applied to the first nonplanar surface varies nonuniformly along the width of the working surface.

13. The method of claim 12, wherein the working surface of the roller disk is crowned nonuniformly from a center to opposing first and second edges.

14. The method of claim 11, wherein the deep rolling tool shaft assembly comprises:
a solid shaft extending along the first axis to restrain movement only along the first axis; and
a resilient element disposed at a distal end of the solid shaft adjacent to the hub.

15. The method of claim 14, wherein the resilient element comprises a plurality of stacked Belleville washers.

16. The method of claim 14, wherein the solid shaft is supported by a linear bearing.

17. The method of claim 11, and further comprising connecting the proximal end of the shaft to an automated machine.

18. The method of claim 11 and further comprising using the tool to perform a second rolling operation on a second nonplanar surface of the workpiece.

19. The method of claim 17, wherein the second nonplanar surface is directly opposite the first nonplanar surface.

20. The method of claim 11, wherein the roller disk is rotatable about the second axis perpendicular to the first axis.

* * * * *